United States Patent [19]

Bamberger et al.

[11] 4,005,184

[45] * Jan. 25, 1977

[54] THERMOCHEMICAL PROCESS FOR THE PRODUCTION OF HYDROGEN USING CHROMIUM AND BARIUM COMPOUND

[75] Inventors: Carlos E. Bamberger; Donald M. Richardson, both of Oak Ridge, Tenn.

[73] Assignee: The United States of America as represented by the United States Energy Research and Development Administration, Washington, D.C.

[ * ] Notice: The portion of the term of this patent subsequent to Dec. 16, 1992, has been disclaimed.

[22] Filed: July 24, 1975

[21] Appl. No.: 598,918

[52] U.S. Cl. .................... 423/579; 423/596; 423/657
[51] Int. Cl.[2] .......................................... C01B 13/02
[58] Field of Search .......... 423/579, 648, 657, 595, 423/596

[56] References Cited

UNITED STATES PATENTS

| 3,839,550 | 10/1974 | Wentorf, Jr. ...................... 423/657 |
| 3,842,164 | 10/1974 | Wentorf, Jr. ...................... 423/657 |
| 3,927,192 | 12/1975 | Bamberger et al. ................ 423/579 |

Primary Examiner—Earl C. Thomas
Attorney, Agent, or Firm—Dean E. Carlson; David S. Zachry; John B. Hardaway

[57] ABSTRACT

Hydrogen is produced by a closed cyclic process involving the reduction and oxidation of chromium compounds by barium hydroxide and the hydrolytic disproportionation of $Ba_2CrO_4$ and $Ba_3(CrO_4)_2$.

4 Claims, 1 Drawing Figure

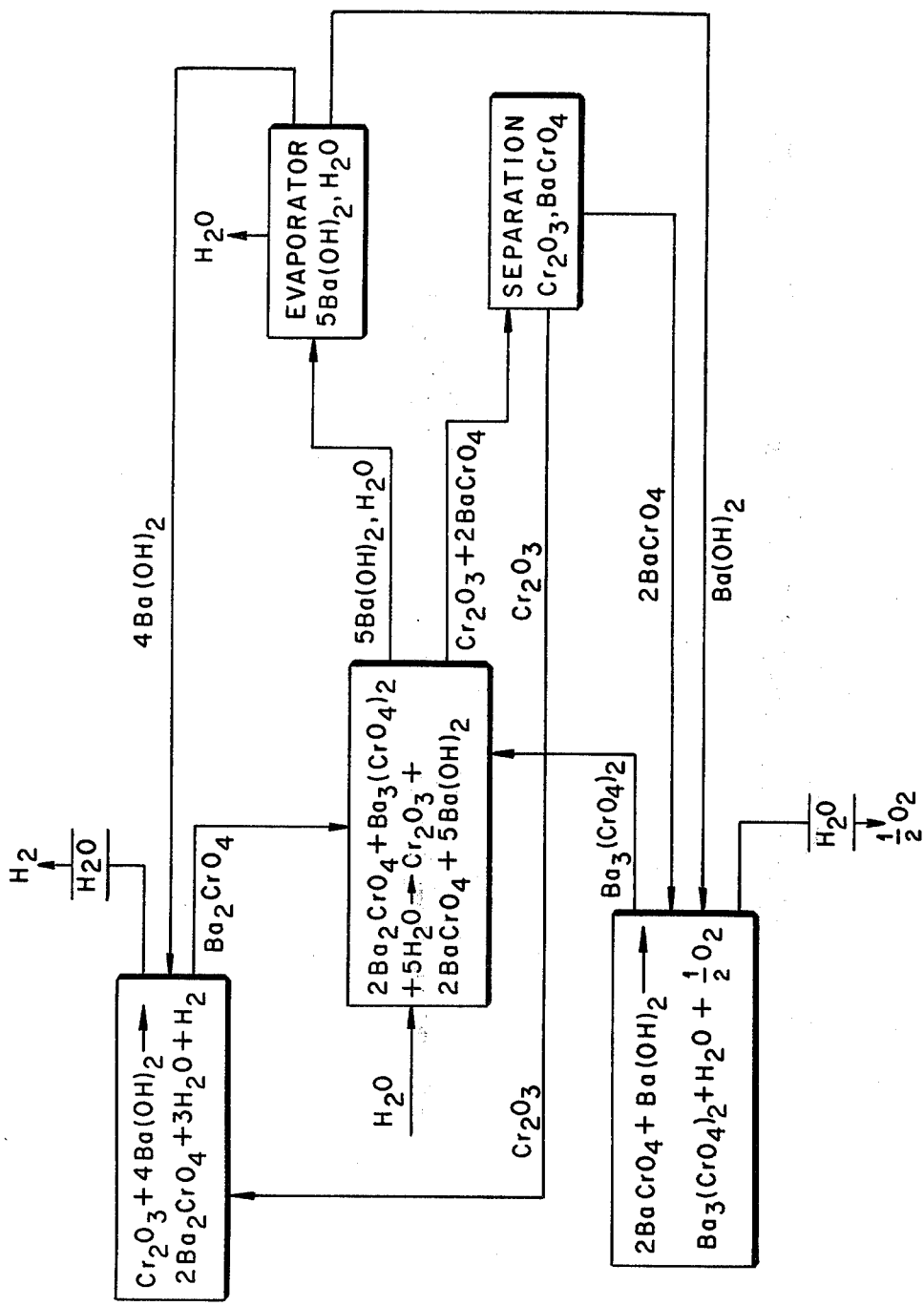

THERMOCHEMICAL PROCESS FOR THE PRODUCTION OF HYDROGEN USING CHROMIUM AND BARIUM COMPOUND

BACKGROUND OF THE INVENTION

This invention was made in the course of, or under, a contract with the Energy Research and Development Administration. It relates generally to the art of thermochemical hydrogen production.

Hydrogen is presently considered to be an attractive energy source for future application. Hydrogen has many attributes which make it a logical replacement for fossil fuels which are being rapidly consumed. The combustion of hydrogen produces no obnoxious products and thus no insult to the environment. Existing energy transport means and consuming equipment can be adapted with present technology for a hydrogen-based energy system. Natural gas pipelines, for example, can be converted to hydrogen carrying pipelines with minor modifications. Experimental automobiles are presently operating with modified conventional internal combustion engines using hydrogen as fuel.

With prospects for hydrogen utilization becoming evident, means for producing hydrogen need to be upgraded and increased. Conventionally, hydrogen has been produced by the electrolysis of water. Electrolysis, however, is highly inefficient when considering the inefficiencies present in electricity production coupled with an efficiency of about 80 percent for electrolysis. Inherent in the use of electrolysis to produce hydrogen is the general futility of using one energy source, typically fossil fuels at present, at the point of electricity production to ultimately produce hydrogen at the point of electrolysis. The disadvantages and excess consumption of fossil fuels are obviously not overcome by such a process. Chemical processes for the direct conversion of fossil fuels and water into a hydrogen product are presently at the point of technical feasibilty. This overcomes many of the inefficiencies and disadvantages of electrolysis. However, prudence indicates that fossil fuels should be preserved to the extent possible for long term pharmaceutical, chemical and metalurgical uses.

Thermochemical processes present the most attractive means for producing hydrogen. Via this technique water is broken down into hydrogen and oxygen through a series of chemical reactions not involving the use of fossil fuels. This series of reactions is desirably carried out in a closed cyclic manner such that all products except hydrogen, and oxygen are reused as reactants in the other reactions. One such process is disclosed in U.S. Pat. No. 3,490,871, which utilizes the reaction of cesium with water to release hydrogen. Another such process is disclosed in commonly assigned copending application Ser. No. 487,323 of July 10, 1974, which involves the reaction of copper and magnesium chlorides with water to produce hydrogen in a closed cyclic manner. Another such process is disclosed in commonly assigned copending application Ser. No. 545,042. Such process as is therein disclosed comprises reacting chromium oxide with an alkali metal hydroxide to produce hydrogen, water, and alkali metal chromate as reaction products. Commonly assigned application Ser. No. 504,790 discloses another closed cyclic process for splitting water wherein magnetite is reacted with an alkali metal hydroxide to produce hydrogen, alkali metal ferrate and water as products.

One of the subjects of the thermochemical process is the direct utilization of heat from an energy producing facility such as a nuclear reactor or solor sources. The upper temperature limit of such source is presently about 1300° K for a high-temperature, gas-cooled reactor and 3500° K for a solar furnace.

SUMMARY OF THE INVENTION

It is thus an object of this invention to provide a cyclic thermochemical process for producing hydrogen and oxygen.

It is a further object of this invention to provide such a process wherein no reactions are carried out at a temperature greater than 100° C.

These as well as other objects are accomplished by a process comprising the reactions of chromium compounds with barium hydroxide and the subsequent hydrolytic disproportionation of barium chromates.

BRIEF DESCRIPTION OF THE DRAWING

The single FIGURE of drawing is a flow chart of the cyclic process in accordance with this invention.

DETAILED DESCRIPTION

In accordance with this invention it has been found that the reaction of chromium oxide with barium hydroxide to produce hydrogen, water, and barium chromate can be incorporated into a cyclic process for splitting water into hydrogen and oxygen.

The cycle comprises three reactions which are illustrated in the flow chart of the attached figure of drawing along with the various separations between reactions. The reactions which comprise the cyclic process in accordance with this invention are:

$Cr_2O_3 + 4 Ba(OH)_2 \rightarrow 2 Ba_2CrO_4 + 3 H_2O + H_2$  1.
$Ba_3(CrO_4)_2 + 2 Ba_2CrO_4 + 5 H_2O \rightarrow Cr_2O_3 + 2 BaCrO_4 + 5 Ba(OH)_2$  2.
$2 BaCrO_4 + Ba(OH)_2 \rightarrow Ba_3(CrO_4)_2 + H_2O + ½ O_2$  3.

Reaction (1) is carried out at a temperature within the range of 500° to 700° C but preferably at about 620° C where the reaction kinetics are at a maximum. Barium hydroxide is a liquid above about 400° C, such that reaction (1) is preferably carried out batchwise by placing a stoichiometric amount of chromium oxide and barium hydroxide in a reaction vessel in an intimately mixed powder form. The reaction vessel is then heated to the reaction temperature while continuously exhausting the gaseous phase within the reaction vessel. The reaction mixture at temperature is a dispersion of chromium oxide powder in liquid barium hydroxide. The reaction goes to substantial completion in a reasonable time period within the above cited temperature ranges, e.g., 60 to 150 minutes. Optionally, the reaction may be carried out while bubbling an inert carrier gas through the reacting mass to dilute the hydrogen product for reasons of safety. It is preferred, however, to use no carrier because of subsequent separations which would be necessary for recovery of pure hydrogen.

The reaction when carried out as described above produces hydrogen and water in the gaseous form which are removed from the reaction vessel by continuously exhausting the atmosphere above the reacting mass. Once the gases are removed water is separated by conventional condensation processes. At the conclusion of the reaction which is detected by the cessation of product gases, a solid mass of $Ba_2CrO_4$ remains in the reaction vessel. This product, as is depicted in the flow chart of the figure of drawing, is used as a reactant in a subsequent process step.

The next step of the process involves the hydrolysis reaction of $Ba_2CrO_4$ which forms a part of reaction (2). The hydrolysis of $Ba_2CrO_4$ proceeds as follows:

$$2\ Ba_2CrO_4(s) + 10/3\ H_2O(l) \rightarrow 2/3\ BaCrO_4(s) + \tfrac{2}{3} Cr_2O_3(s) + 10/3\ Ba(OH)_2 \quad\quad 4.$$

This reaction is best carried out by exposing the $Ba_2CrO_4$ to water at a temperature within the range of 70° to 100° C in a Soxhlet extractor. The extractor is operated in a conventional manner by boiling water from a reservoir and condensing steam on the powdered $Ba_2CrO_4$. The $Ba_2CrO_4$ rests on a fritted filter. When the Soxhlet is full, the liquid is siphoned back to the reservoir to begin a second cycle. The $Ba(OH)_2$ remains in the reservoir for reuse in reaction (1). About 24 hours is required for this reaction step to go to completion The products of this reaction are thus partially soluble $Ba(OH)_2$, which remains in the reservoir, and solid insoluble $Cr_2O_3$ and $BaCrO_4$. The $Ba(OH)_2$ is concentrated by evaporation for reuse in reaction (1). The $Cr_2O_3$ and $BaCrO_4$ products are solid discreet particles which can be separated by froth flotation, density gradient centrifugation, or dissolution using a selective solvent. The preferred separation technique is dissolution using sodium hydroxide as a selective solvent for $Cr_2O_3$. This process is best carried out by contacting the product powders with about 10 Normal sodium hydroxide at 100° C for about five minutes using 40 milliliters of solvent for every gram of solid. The solid and liquid are separated by centrifugation which yields $BaCrO_4$ for use in reaction (3). The solid is preferably contacted about three times with fresh NaOH solution after which all supernatant fractions are combined. The combined supernatant is diluted 5 to 20, and preferable about 10-fold to bring about precipitation of hydrated $Cr_2O_3$ for use in reaction (1). The Na(OH) solution is preferably heated to boiling during dilution so as to bring about coagulation of the $Cr_2O_3$ precipitate. Coagulation facilitates separation by filtration. After recovering the hydrated $Cr_2O_3$, the NaOH solution is evaporated to its original concentration for reuse in a subsequent separation. A small amount of sodium chromate forms during the separation which remains at a constant level after equilibrium is achieved. For this reason it is preferred to continuously reuse the NaOH rather than use a fresh solution for each separation.

Reaction (3) can be carried out at a temperature within the range of 650° to 950° C but is preferably carried out at about 820° C where the oxygen concentration is a maximum. Reaction (3) is best carried out in a manner similar to that of reaction (1) by continuously evacuating the reaction vessel. At the reaction temperature, $Ba(OH)_2$ is liquid such that a dispersion of $BaCrO_4$ is within the liquid to form a reaction mass. Water and oxygen produced in the reaction are continuously removed from the reaction chamber by the evacuation of the vessel. The reaction is complete when no further oxygen is detected in the off gas stream. Generally about 60 minutes is required for the reaction to go to substantial completion within the operable temperature ranges. The reaction time, however, is somewhat dependent on the heating rate. The evacuated gases are passed through a condenser to remove the water. Substantially pure oxygen is then tanked as a valuable byproduct of this process.

The $Ba_3(CrO_4)_2$ produced by reaction (3) is hydrolyzed in exactly the same manner as the product from reaction (1). Since the hydrolysis products of $Ba_3(CrO_4)_2$ are identical to the products produced by the hydrolysis of $Ba_2CrO_4$, these reactions are preferably carried out simultaneously as is depicted in the figure of drawing. The hydrolysis of $Ba_3(CrO_4)_2$ proceeds as follows:

$$Ba_3(CrO_4)_2 + 5/3\ H_2O \rightarrow 4/3\ BaCrO_4 + \tfrac{1}{3} Cr_2O_3 + 5/3\ Ba(OH)_2 \quad\quad 5.$$

Reactions (4) and (5) thus combine to produce reaction (2) which is the preferred method of carrying the process of this invention. At this point one cycle of the process is complete and water has been effectively split into hydrogen and oxygen.

Having generally described the process in accordance with this invention, the following specific examples are given as further illustration thereof.

EXAMPLE I

Reaction (1) was carried out by placing 6 grams of $Cr_2O_3$ and 29 grams of $Ba(OH)_2 \cdot 5\ H_2O$ in a platinum crucible. The reaction was carried out within the quartz tube furnace using argon as an inert carrier gas. The temperature was varied continuously from room temperature to about 950° C. The concentration of hydrogen was continuously measured by monitoring the differential thermal conductivity of the exiting gas mixture as a function of temperature. Hydrogen evolved at temperatures in the range of 500° to 700° C with a maximum rate of evolution occuring at about 620° C. The resulting solids were analyzed before and after methanol extraction which removed $Ba(OH)_2$ by (a) chemical methods to determine the ratio Ba/Cr and the average valence of chromium, (b) by electron paramagnetic resonance (EPR) to determine the presence of $Cr^{3+}$(unreacted $Cr_2O_3$), and (c) by x-ray diffraction. The chemical analysis indicated a Ba/Cr ratio of 2.08, which is in good agreement with the theoretical value of 2.00. The average valence ranged from 3.78 to 4.12 of the five samples taken. This is also a close agreement with a theoretical value of 4.00. The results obtained by EPR indicated that unreacted $Cr_2O_3$ was low, 10% or less, thus confirming the results of chemical analysis. X-ray diffraction patterns were then identified to correspond to $Ba_2CrO_4$.

EXAMPLE II

Reaction (2), the hydrolytic disproportionation of the compounds of $Cr^{4+}$ and $Cr^{5+}$, was studied by contacting a mixture of 11.5 grams of $Ba_3(CrO_4)_2$ and 14 grams of $Ba_2CrO_4$ with 60 milliliters of distilled water at a temperature of about 70° C within a Soxhlet extractor. Analysis of the product after 40 hours showed a ratio of Ba/Cr of 0.61 and an average chromium valence of 4.55; the theoretical values are 0.50 and 4.50, respectively.

EXAMPLE III

Reaction (3) was demonstrated by placing 12.9 grams of $BaCrO_4$ and 6.63 grams of $Ba(OH)_2 \cdot 5\ H_2O$ in a platinum crucible within a quartz tube furnace. In the present experiment, where argon was used as a carrier gas, the presence of oxygen was determined continuously by an amperometric method using a "Beckman" Process Oxygen Monitor (Model 715) while the temperature of the reaction was continuously increased from room temperature to 1000° C. The total yield of oxygen, based on the $BaCrO_4$ initially present, ranged from 93 to 98% after 80 minutes. The product of the reaction was analyzed. The results indicated that $Cr^{6+}$ had been reduced to an average valence of 5.1 to 5.11. The reaction indicated oxygen began to be evolved at about 650° C with a maximum rate of evolution occuring at approximately 840° C. X-ray diffraction also confirmed that the product obtained was $Ba_3(CrO_4)_2$.

EXAMPLE IV

Experimentally, the solids from reaction (2) were ground to less than or equal to 45 microns and suspended in CLERICI's solutions (T1-formate and T1-malonate) having densities in the range of 3.9 to 4.29/ml. The suspension was centrifuged at approximately 2000 rpm for 20 to 30 minutes, and a separation was observed. The residue was yellow, and the supernatant was green with a dark green band at the top of the liquid. Chemical analysis of the thoroughly washed residue indicated $BaCrO_4$ was separated with some contamination by $Cr_2O_3$. A reaction, however, with the reagent was observed.

EXAMPLE V

About one gram of solid $Cr_2O_3$ and $BaCrO_4$ produced by hydrolyzing $Ba_2CrO_4$ was stirred with 40 ml of 10 N NaOH at 100° C for five minutes. The solution was separated by centrifugation. The solid residue was contacted in the same manner two additional times with fresh NaOH solution. The supernatant fractions were combined and diluted about 15-fold with distilled water at a temperature within the range of 70° to 100° C. Solid hydrous $Cr_2O_3$ formed in seconds and was separated by filtration. Analysis of the solid which remained after being contacted with the NaOH solution indicated a composition containing 20.8 wt. percent Cr and average chromium valence of 5.66. This indicates that 66% of the $Cr_2O_3$ was removed by this contacting step.

It is thus seen that the process in accordance with this invention provides a closed cyclic method for splitting water into hydrogen and oxygen using reaction temperatures of less than 1000° C. Various modifications within the Ba/Cr system will be apparent to those of skill in the art. Such modifications may include the formation of $Ba_5(CrO_4)_3OH$ as an intermediate instead of $Ba_3(CrO_4)_2$.

What is claimed is:

1. A cyclic process for splitting water into hydrogen and oxygen, comprising the steps of:
   reacting (1) chromium oxide with barium hydroxide to produce hydrogen, water and $Ba_2CrO_4$ as reaction products;
   separating hydrogen and water from the reaction environment;
   reacting (2) said $Ba_2CrO_4$ with $Ba_3(CrO_4)_2$ and water to form said chromium oxide, $BaCrO_4$ and barium hydroxide;
   reusing a part of said barium hydroxide and said chromium oxide in said first mentioned step of reacting;
   reacting (3) the remainder of said barium hydroxide with said $BaCrO_4$ to produce said $Ba_3(CrO_4)_2$, water and oxygen;
   separating said water and oxygen from the reaction environment; and
   reusing said $Ba_3(CrO_4)_2$ in said second mentioned step of reacting.

2. The process according to claim 1 wherein said first mentioned step of reacting is carried out at a temperature within the range of 500° and 700° C.

3. The process according to claim 1 wherein said second mentioned step of reacting is carried out within the temperature range of 70° and 100° C.

4. The process according to claim 1 wherein said third mentioned step of reacting is carried out at a temperature within the range of 650° to 950° C.

* * * * *